United States Patent [19]

Anderson et al.

[11] Patent Number: 4,587,888
[45] Date of Patent: May 13, 1986

[54] EXTENSIBLE PISTON WITH BREAKABLE OR DISPLACEABLE COUPLER

[75] Inventors: Bruce W. Anderson, Niles, Mich.; Warren D. Chambers, South Bend, Ind.

[73] Assignee: Allied Corporation, Morristown, N.J.

[21] Appl. No.: 741,932

[22] Filed: Jun. 6, 1985

Related U.S. Application Data

[62] Division of Ser. No. 578,711, Feb. 9, 1984, abandoned.

[51] Int. Cl.⁴ ............................................. F15B 15/24
[52] U.S. Cl. ......................................... 92/13.6; 92/51; 403/324
[58] Field of Search ............... 92/13.1, 13.6, 20, 23, 92/30, 51; 188/71.8, 72.4, 196 R; 403/316, 324, 327, 328, 13, 14; 285/378, 315, 316, 317

[56] References Cited

U.S. PATENT DOCUMENTS

| | | | |
|---|---|---|---|
| 3,398,492 | 8/1968 | Nansel | 92/23 X |
| 3,398,645 | 8/1968 | Nansel | 92/20 X |
| 3,682,506 | 8/1972 | Bruyere et al. | 285/315 X |
| 3,707,303 | 12/1972 | Petri | 403/328 |
| 4,249,458 | 2/1981 | Massing | 92/13.6 X |

Primary Examiner—Robert E. Garrett
Assistant Examiner—Mark A. Williamson
Attorney, Agent, or Firm—Larry J. Palguta; Ken C. Decker

[57] ABSTRACT

A fluid pressure actuated piston (78) is slidably carried in a fluid pressure actuated cylinder (50) which, in turn, is slidably carried in a fixed carrier or casing (21). Movement of the cylinder (50) is resisted by a breakable or displaceable coupler (90, 94, 184, 185) which engages the cylinder (50). Fluid pressure acting upon the cylinder (50) and piston (78) causes the coupler (90, 94, 184, 185) to break or be displaced and release the cylinder (50) for axial movement in the direction of movement of the pressure responsive piston (78).

4 Claims, 9 Drawing Figures

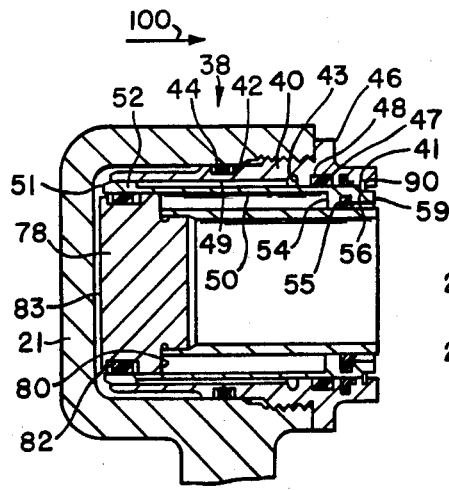
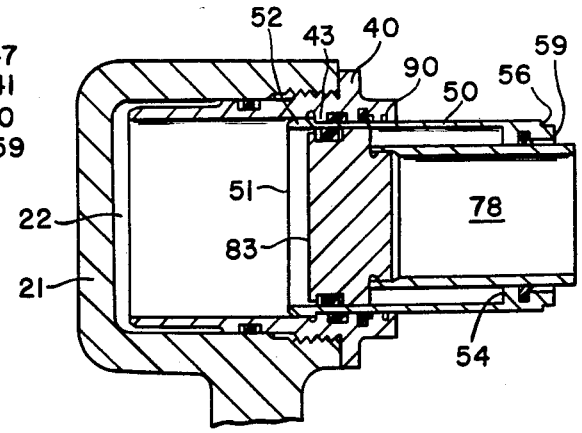
FIG. 2  FIG. 2a
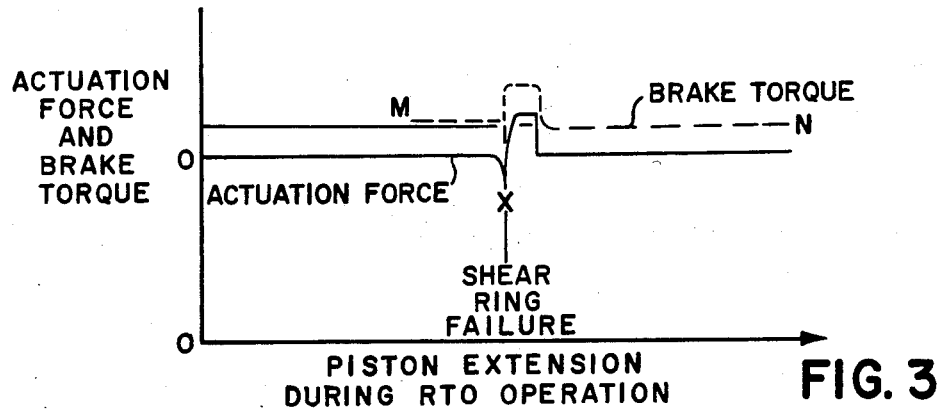
FIG. 3
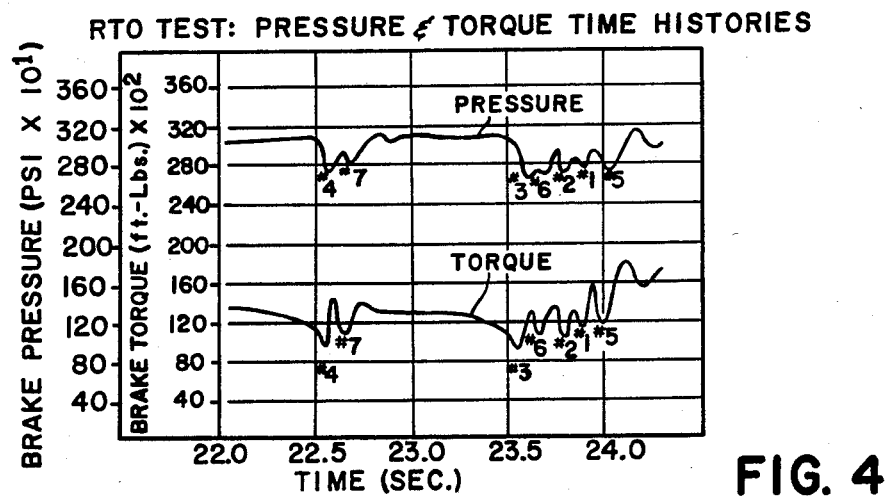
FIG. 4

EXTENSIBLE PISTON WITH BREAKABLE OR DISPLACEABLE COUPLER

This is a divisional of application Ser. No. 578,711 filed on Feb. 9, 1984, now abandoned.

This invention relates to an extensible piston with a breakable or displaceable coupler which releases a cylinder for axial travel in a direction of movement of the extensible piston.

The present invention relates to an aircraft brake adjuster, and more specifically to fluid pressure actuated pistons having an extended range of travel. Pistons having an extended range of travel are also known as extensible pistons and are described in the following patents: Price U.S. Pat. No. 4,006,669 issued Feb. 8, 1977 and entitled "Piston and Extensible Cylinder Therefor"; Ditlinger U.S. Pat. No. 4,208,952 issued June 24, 1980 and entitled "Piston with Extended Axial Travel"; and Massing U.S. Pat. No. 4,249,458 issued Feb. 10, 1982 and entitled "Piston and Extensible Cylinder Therefor". These prior constructions have utilized a telescoping cylinder disposed about the piston in order to provide for the extended range of piston travel, but have the disadvantage of providing greater actuating force at one time or another because of the differential areas of the cylinder and piston utilized during actuation of the brake. The area of the end of the telescoping cylinder acts as a piston until the cylinder extends and engages a stop. The result is that the brake can have too great an actuating force during part of its life or too small an actuating force during part of its life, depending upon the design of the particular brake. Providing compensation for the differential forces acting upon the piston and cylinder has involved the use of mechanical and hydraulic schemes which lessen the actuating force when the outer telescopic sleeve is operative. These compensation devices and designs have often times displayed erratic effects at the cylinder release transition point or provide compensation which is effective at one pressure only.

It is an object of the present invention to provide a telescoping cylindrical sleeve which is held fixed relative to the brake carrier or casing by a locking mechanism until the piston is fully extended. At full extension of the piston, the locking mechanism releases the telescoping cylinder which immediately extends to its fully extended position against a stop and thereby provides the piston with another length of available travel without the utilization of any differential piston area.

The present invention comprises a fluid pressure actuated piston slidably carried in a fluid pressure actuated cylinder which, in turn, is slidably carried in a fixed carrier or casing. Lateral movement of the cylinder is resisted by a breakable or displaceable coupler which engages a shoulder of the cylinder. Fluid pressure acting upon the cylinder and piston causes the coupler to break or be displaced and release the cylinder for axial movement in the direction of movement of the pressure responsive piston.

The invention provides a savings in weight because the construction permits utilization of a shorter torque tube design or structure, also provides an increased heat sink envelope potential, a momentary drop or dip in the actuating force or torque during failure or displacement of the coupler which has a negligible affect upon brake performance and may actually improve the stopping distance, improves the performance of the brake in comparison to a brake using conventional pistons, and provides a simplified design for easily manufactured and assembled parts of an aircraft brake.

The invention is described in detail below with reference to the drawings which illustrate several embodiments in which:

FIG. 2 is a sectional view of one embodiment of the present invention shown in enlarged form and removed from the wheel and disc brake of FIG. 1;

FIG. 2A illustrates the brake of FIG. 2 after release of the telescoping cylinder;

FIG. 3 is a graph illustrating actuation force and brake torque versus piston travel;

FIG. 4 is a graph illustrating brake pressure and torque versus time for the performance of seven pistons in an aircraft disc brake assembly;

Figure 1:
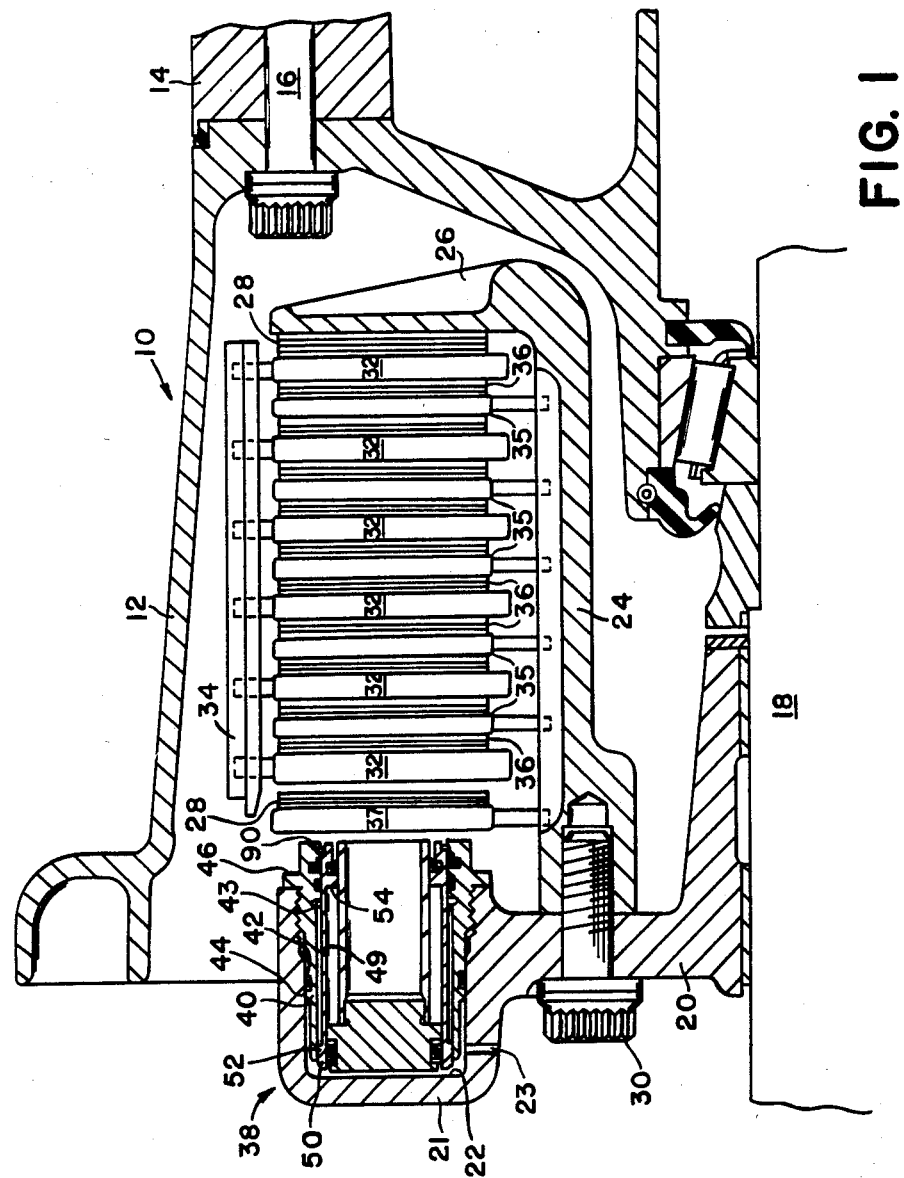
FIG. 1 is a sectional schematic representation of a conventional aircraft wheel and disc brake assembly embodying the prevent invention.

Referring to FIG. 1, numeral 10 designates an aircraft wheel and multiple disc brake thereof. The wheel is defined by two annular sections 12 and 14, only one of which is fully shown, fastened together by circumferentially spaced-apart bolts and nuts generally indicated by 16. The wheel is suitably journalled on a rotatably fixed axle 18 carried by conventional aircraft landing gear structure (not shown). An annular brake carrier 20 keyed to axle 18 is provided with a plurality of circumferentially spaced-apart casings 21, only one of which is shown, each having a cavity 22 vented via passage 23 to a source of pressurized fluid (not shown) controlled by the aircraft pilot. A torque tube 24 having an integral backing plate 26 is lined with frictional material 28 and fixedly secured to carrier 20 by a plurality of circumferentially spaced-apart bolts 30. Axially spaced-apart annular brake rotor members 32 are keyed to a retaining member 34 fixedly secured to wheel section 12 and adapted to permit axial movement of the rotor members 32 relative to wheel section 12. Annular brake stator members 35 having friction linings 36 secured to opposite faces thereof are keyed to torque tube 24 for axial movement. A pressure plate 37 is keyed to torque tube 24 for axial movement and, like backing plate 26 provided with lining 28, is adapted to be actuated by a plurality of piston means generally indicated by reference numeral 38, the piston means disposed in cavities 22 of casings 21. Upon energization of the piston means 38, pressure plate 37 is urged toward backing plate 26 to compress the stacked stator and rotor members 35, 32 together to retard rotation of wheel sections 12 and 14.

Referring to FIGS. 1–2A, cavities 22 are each provided with a sleeve 40 threadedly engaged with casing 21, the sleeve 40 provided with an annular recess 42 containing an "O" ring or similar seal 44 as well as having a flange portion 46 adapted to be engaged by suitable wrench means (not shown) for assembly and disassembly purposes. The sleeve 40 has a reduced diameter inner shoulder 43 disposed adjacent the open end of cavity 22 where sleeve 40 threadedly engages casing 21. Located adjacent the inner shoulder 43 is recess 47 receiving annular seal means 48 therein.

A fluid pressure actuated cylinder 50 having a diameter smaller than the interior diameter of sleeve 40 is slidably received within the interior of sleeve 40. Located at the closed end of casing 21 is an enlarged cylinder diameter shoulder 52 which is disposed diagonally from a reduced cylinder diameter inner shoulder 54 located at the open end of cavity 22. Cylinder 50 is designed for axial travel outwardly of cavity 22 during which it is slidably engaged with the inner surface 49 of sleeve 40, the axial travel being limited by the engagement of enlarged diameter shoulder 52 with the reduced diameter inner shoulder 43 of sleeve 40. FIG. 2 illustrates a breakable shear ring 90 fixedly received in recess 41 of sleeve 40. Cylinder 50 includes an outer shoulder 56 which engages the shear ring 90 to maintain the cylinder 50 at its initial axial position. Cylinder 50 also includes an annular opening 55 receiving an annular wiper seal therein for engagement with the outer surface of a piston 78 to preclude contaminants from entering between the adjacent surfaces of cylinder 50 and piston 78.

The cup-shaped piston 78 slidably engages cylinder 50. Piston 78 includes an enlarged diameter rim shoulder 80 having an annular recess receiving annular O-ring or fluid seal 82 therein for engagement with the inner surface of cylinder 50. The fluid seal 82 resists fluid leakage between the adjacent surfaces of cylinder 50 and piston 78.

It should be noted that the above-described structure of piston means 38 is adapted to be assembled as a unit and subsequently positioned in cavity 22 by screwing sleeve 40 therein.

Assuming that the brake apparatus of FIG. 2 is in position as shown in FIG. 1, a brake application by the aircraft pilot results in pressurization of fluid supplied to cavities 22 and subsequent equal pressurization of pistons 78 which move away from the respective closed ends of casings 21 to compress rotor members 32 and stator members 35 together to produce the desired braking action of wheel sections 12 and 14. Each piston 78 travels axially outwardly of the associated cavity 22 and, as the brake linings 28 wear down during repeated engagement with rotor members 32, the piston 78 is displaced axially a further distance until enlarged diameter rim shoulder 80 engages the reduced diameter inner shoulder 54 of cylinder 50. At this point, piston 78 cannot be displaced axially any further to the right in the direction of arrow 100 of FIG. 2, because shear ring 90 maintains cylinder 50 axially fixed relative to sleeve 40 and shoulder 54 maintains the extended axial position of piston 78. Shear ring 90 is designed such that fluid pressure acting upon the end wall 83 of piston 78 combined with fluid pressure acting upon the surface area of end 51 of cylinder 50 cause the shear ring 90 to fail or break and thereby release cylinder 50 for further axial movement in the direction of movement of the piston 78. The cylinder 50 moves immediately to the right in direction of arrow 100 whereupon shoulder 52 engages shoulder 43 of sleeve 40, and thus provides for extended travel of piston 78 (see FIG. 2A). At the time of shear ring failure, piston 78 is extended such that shoulder 52 of cylinder 50 will engage sleeve shoulder 43 before engaging pressure plate 37.

At or just prior to the failure of shear ring 90, there occurs a momentary drop in the actuating force and brake torque acting upon the stator and rotor member providing braking. This momentary, slight drop in the brake torque occurs because the piston is momentarily restrained by shear ring 90 from further axial travel against the pressure plate 37, and when the shear ring 90 fails there is flow of fluid into the cavity 22 to compensate for the displacement of the cylinder in the direction of arrow 100. Referring to FIG. 4, the graph illustrates the drop in brake torque as a result of the force required to break the shear ring after engagement of rim shoulder 80 with reduced diameter inner shoulder 54 of cylinder 50. FIG. 3 illustrates, in general terms, the brake torque (curve m-n) which may occur as the brake linings 28 are worn. The brake torque may decrease slightly as the pistons are extended further axially due to brake wear, with the brake actuation force remaining relatively constant during this period. When brake wear 0-X has occurred, the actuation force and brake torque both dip momentarily when the shear ring 90 fails which then permits the conjoint axial displacement of cylinder 50 and piston 78. This produces a momentary or transient increase in actuating force and brake torque as sleeve 50 and piston 78 act conjointly against pressure plate 37, in response to the fluid pressure acting upon the opposite ends of the sleeve and piston. The increases in actuation force and brake torque are illustrated by the momentary jump in both curves, after which both the actuation force and brake torque remain at relatively constant levels as the piston engages pressure plate 37. The area of end 51 of cylinder 50 is kept at a minimum value, i.e., a small end thickness of cylinder 50, in order to minimize the negative dip in the actuation force and brake torque curves.

It has been found that the negative dip in each curve of FIG. 3 is insignificant in practical application. Rejected takeoff (RTO) tests for new brakes require that certain parameters be met by aircraft brakes. It has been found that the new brake RTO requirements Would be achieved with the piston means of the present invention, and that partially worn or worn brake RTO performance would generally be unchanged. The reduction in actuating force at the brake wear point X, and the momentary increase in both the actuation force and brake torque as illustrated in FIG. 3, are of little practical significance because, due to manufacturing tolerances, all of the brakes on an aircraft would not wear uniformly and therefore failures of the shear rings occur at different landings for different brakes of the aircraft. Additionally, the various shear rings will fail at slightly different stroke positions in a given brake, coupled with different brakes experiencing failure of the respective shear rings during different landings.

During rejected takeoff tests, the piston stroke is large in comparison to the small displacement involved in loading and causing failure of the shear ring 90. A momentary spike in the force actuation curve and brake torque curve would be negligible in comparison to the increased actuation force and torque which results. The RTO would be essentially unaffected and possibly enhanced due to the pulse or spike which tends to overcome the keyway friction experienced by rotors 32 and stators 35.

In the design of the shear ring 90, it would be desirable to have the release force of telescoping cylinder 50 be as low as possible, with the ring 90 still able to withstand vibration and environmental effects such as temperature changes, during its life. Shear rings 90 may comprise O grade pure aluminum and have a thickness of thirty to forty thousands of an inch.

Rejected takeoff tests have determined that the drop in brake torque during failure of the shear ring has a negligible effect on aircraft brake performance. The graph of FIG. 4 illustrates the change in brake pressure (actuation force) and brake torque versus time during a rejected takeoff test. As explained above, because of manufacturing tolerances the brake linings 28, 36 will wear differently and thus the respective shear rings will fail at different times for a given brake. The graph of FIG. 4 illustrates the operation of seven pistons (#1–#7) of a single aircraft brake assembly, during a rejected takeoff test. The brake experiences very small and temporary decreases in both brake pressure and brake torque when the respective shear rings fail due to the combined pressure acting upon the pistons and cylinders. These failures of the respective shear rings occur at different times during the rejected takeoff test. It was found that the stopping distance during a rejected takeoff test for the extensible piston of the present invention was less than for a like RTO test utilizing conventional pistons.

Figure 5:
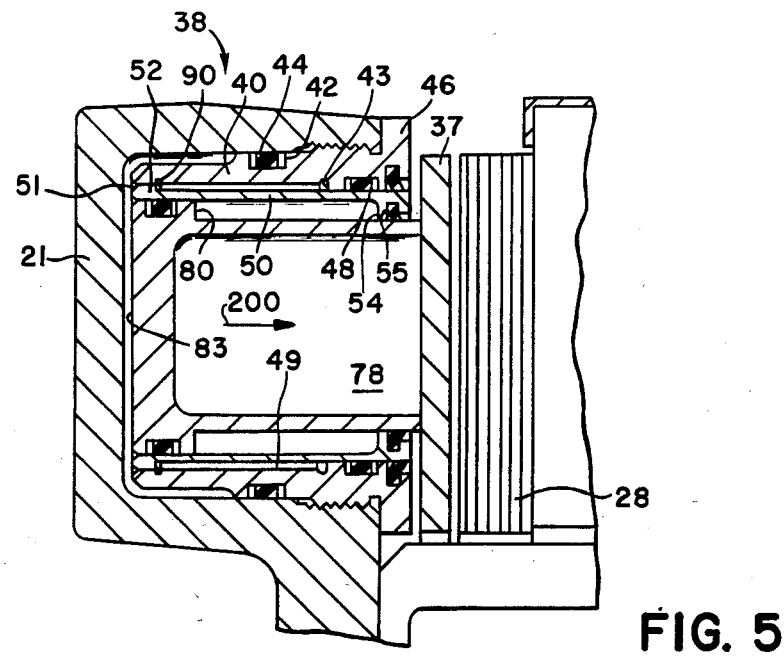
FIG. 5 is a sectional view of another embodiment of the present invention shown in enlarged form.

Referring now to FIG. 5, there is illustrated an alternative embodiment of the invention illustrated in FIG. 2. FIG. 5 illustrates the positioning of the shear ring 90 at an interior position of cavity 22. Sleeve 40 fixedly receives shear ring 90 in a recess adjacent its interior end, whereby ring 90 engages enlarged diameter shoulder 52 of cylinder 50. When fluid pressure displaces axially piston 78 in the direction of arrow 200, and the brake linings 28, 36 wear to the extent that rim shoulder 80 of piston 78 engages reduced diameter inner shoulder 54 of cylinder 50, the combined fluid pressure acting upon the piston and sleeve causes shear ring 90 to break. Cylinder 50 is displaced axially and simultaneously shoulder 52 moves the broken portion(s) of shear ring 90 in the direction of arrow 200 until enlarged diameter shoulder 52 biases the broken portion(s) against the reduced diameter inner shoulder 43 which restrains cylinder 50 from any further axial movement. By placing shear ring 90 interiorily of piston means 38, the risk of damage due to foreign objects located about the exterior of piston 78 is eliminated.

Figure 6:
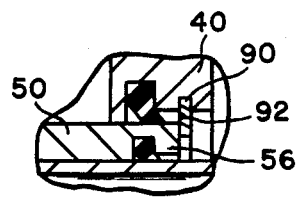
FIG. 6 is a sectional view of another embodiment of the present invention shown in enlarged form.

Shear ring 90 may also be modified in a number of ways in order to effect failure at a predetermined fluid pressure acting upon the piston and cylinder. FIG. 6 illustrates shear ring 90 being fixedly secured in a recess of sleeve 40 and engaging outer shoulder 56 of cylinder 50, in the same manner as illustrated in FIGS. 1–2. However, shear ring 90 includes a notch 92 which structurally weakens the ring so that it will fail at a predetermined fluid pressure acting upon the piston and cylinder. It should be clearly understood that the shear ring illustrated by FIG. 6 can be positioned either interiorily or exteriorily of piston means 38, as illustrated by FIGS. 1, 2 and 5, the particular location of the ring being a matter of choice for the particular application.

Figure 7:
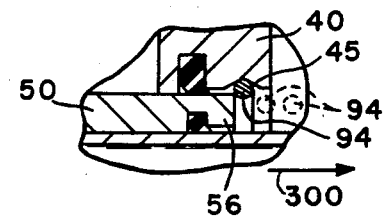
FIG. 7 is a sectional view of another embodiment of the preent invention comprising a displaceable stop.

FIG. 7 illustrates another embodiment of the present invention. Illustrated in schematic representation is a portion of the sleeve 40 including a recess 45 receiving a displaceable stop ring 94. The displaceable stop ring 94 engages shoulder 56 of cylinder 50, and when the combined fluid pressure acting upon the cylinder and piston reaches a sufficient, predetermined magnitude, displaceable stop ring 94 is displaced from recess 45 to release cylinder 50 for axial extension in the direction arrow 300. The displaceable stop ring 94 is displaced in the direction of the dotted line figures illustrating the axial positions of the stop ring, and stop ring 94 may be located either interiorily or exteriorily of piston means 38, in accordance with illustrations of FIGS. 1, 2, and 5, the particular location of the stop ring being a matter of choice according to the application and customer needs.

Figure 8:
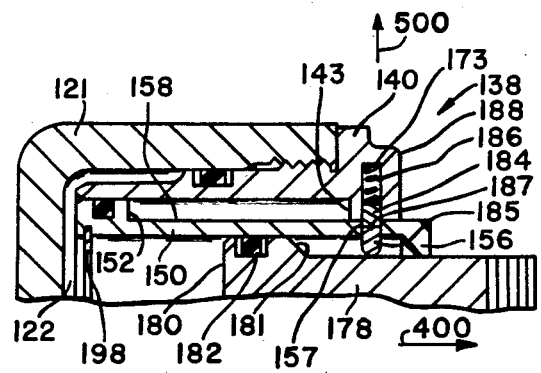
FIG. 8 is an embodiment of the present invention comprising a displaceable stop biased radially inwardly by resilient means.

Another displaceable stop for retaining the cylinder of the piston means is illustrated in FIG. 8. The numerals of FIG. 8 have been increased by 100 where there are structural elements in common with those illustrated in the previous Figures. Casing 121 provides a cavity 122 including therein piston means 178. A sleeve 140 is threadedly received in the casing 121, and includes a reduced diameter inner shoulder 143 at its exterior end 188. Located within end 188 is recess 173 receiving a coil spring 186 therein. The coil spring 186 biases pin 184 and separate pin 185 radially inwardly through cylinder opening 157 of cylinder 150 and toward piston 178. Piston 178 includes an enlarged diameter rim shoulder 180 having a ramp 181. In operation, as piston 178 is extended axially in the direction of arrow 400, ramp 181 engages pin 185 to bias pins 184 and 185 radially outwardly in the direction of arrow 500 so that pin 184 retracts into recess opening 173. Pins 184 and 185 are separate pins, and as pin 185 displaces pin 184 radially outwardly into recess 173, the interface 187 between the pins approaches the outer surface 158 of cylinder 150. When interface 187 reaches the outer surface 158 of cylinder 150 whereby pin 184 no longer extends into cylinder opening 157, cylinder 150 is no longer retained by pin 184 and extends axially until enlarged diameter shoulder 152 engages reduced diameter inner shoulder 143, thereby providing for extended axial travel of the piston 178.

FIG. 8 also illustrates a feature for preventing the loss of hydraulic fluid should the aircraft hydraulic system malfunction. During brake actuation, fluid pressure in cavity 122 is increased as required in order to overcome the running clearance and press the rotors and stators together for the desired braking effect. When the brakes are released, the fluid pressure in cavity 122 returns to a "residual" value which is low enough to release clamping forces on the rotors and stators, but still greater than zero (typically 50 to 300 psig). If fluid pressure in cavity 122 is lost, it is conceivable that dynamic and static forces could move piston 178 backwards relative to cylinder 150 to the extent that piston seal 182 is no longer compressed by the inner sealing surface of cylinder 150. Under such circumstances, leakage of hydraulic fluid could occur. To prevent fluid leakage, snap ring 198 is inserted into the interior end of cylinder 150. Snap ring 198 prevents excessive backward movement of piston 178, thereby ensuring that seal 182 maintains fluid pressure in cavity 122. The snap ring 198 may be utilized in many extensible piston devices.

Applicants' invention as defined by the drawings and described in the specification and various embodiments may include various structural changes and modifications therein without departing from the scope of the invention as set forth in the following claims:

We claim:

1. Fluid pressure actuated piston means and extensible cylinder means therefor comprising a casing having a cavity therein and the casing having a circumferential opening at an open end of said cavity, radially displaceable stop means and resilient means disposed in said circumferential opening with the resilient means biasing radially inwardly said radially displaceable stop means, cylinder means slidably disposed in said cavity and responsive to pressurized fluid supplied to said cavity, the cylinder means including aperture means disposed adjacent an end thereof and including abutment means disposed at each end thereof, the stop means extending into the aperture means, a piston slidably contained by said cylinder means and responsive to said pressurized fluid, the piston means including engagement means for displacing radially outwardly said displaceable stop means, the pressurized fluid supplied to said cavity acting upon said piston to move said piston relative to said cylinder means and casing, the cylinder means being prevented from extending outwardly relative to said casing by the radially displaceable stop means which extends within said aperture means of the cylinder means, said supply of pressurized fluid displacing the piston so that the engagement means of said piston displaces the stop means radially outwardly until said displaceable stop means exits said aperture means to release said cylinder means for axial movement by the pressurized fluid and thereby allow further movement of said piston relative to said casing.

2. The fluid pressure actuated piston means and extensible cylinder means in accordance with claim 1, wherein said radially displaceable stop means comprises two pins and said engagement and actuation means comprises an inclined surface, the inclined surface engaging a second one of said pins to bias said pins radially outwardly until a first one of the pins exits said aperture means.

3. The fluid pressure actuated piston means and extensible cylinder means in accordance with claim 1, further comprising fixed stop means disposed at an interior end of said cylinder means, said fixed stop means for preventing said piston from retracting to the extent that fluid pressure is lost.

4. The fluid pressure actuated piston means and extensible cylinder means in accordance with claim 1, in combination with aricraft brake means for braking a wheel of an aircraft.

* * * * *

UNITED STATES PATENT AND TRADEMARK OFFICE
CERTIFICATE OF CORRECTION

PATENT NO. : 4,587,888

DATED : May 13, 1986

INVENTOR(S) : BRUCE W. ANDERSON and WARREN D. CHAMBERS

It is certified that error appears in the above-identified patent and that said Letters Patent are hereby corrected as shown below:

Cover Page, line [62], delete "abandoned" and insert ---now U. S. Patent No. 4,570,531---.

Column 1, line 2, delete "abandoned" and insert ---U. S. Patent No. 4,570,531---.

Signed and Sealed this

Twenty-eighth Day of October, 1986

[SEAL]

*Attest:*

DONALD J. QUIGG

*Attesting Officer*    *Commissioner of Patents and Trademarks*